US007587055B2

(12) United States Patent
Kujirai et al.

(10) Patent No.: US 7,587,055 B2
(45) Date of Patent: Sep. 8, 2009

(54) SOUND COLLECTION SYSTEM

(75) Inventors: Toshihiro Kujirai, Kokubunji (JP); Masahito Togami, Kokubunji (JP); Yasunari Obuchi, Kodaira (JP)

(73) Assignee: Hitachi, Ltd, Tokyo (JP)

( * ) Notice: Subject to any disclaimer, the term of this patent is extended or adjusted under 35 U.S.C. 154(b) by 949 days.

(21) Appl. No.: 11/072,228

(22) Filed: Mar. 7, 2005

(65) Prior Publication Data

US 2006/0045289 A1 Mar. 2, 2006

(30) Foreign Application Priority Data

Aug. 24, 2004 (JP) ............................ 2004-243088

(51) Int. Cl.
*H04R 3/00* (2006.01)
*H04R 29/00* (2006.01)
*H04B 3/00* (2006.01)

(52) U.S. Cl. .......................... 381/92; 381/122; 381/56; 381/58; 381/77

(58) Field of Classification Search .................. 381/91, 381/92, 122, 56, 58, 77
See application file for complete search history.

(56) References Cited

U.S. PATENT DOCUMENTS 4,126,827 A * 11/1978 Negrini ..................... 455/90.3
2003/0179890 A1* 9/2003 Matsuo ........................ 381/92

FOREIGN PATENT DOCUMENTS

JP 8-292252 8/1995

OTHER PUBLICATIONS

Toshiaki et al., "Acoustic System and Digital Processing for them", Institute of Electronics, Information and Communication Engineers, (1995), in Japanese with translation of Section 7.1.2.

* cited by examiner

*Primary Examiner*—Vivian Chin
*Assistant Examiner*—George C Monikang
(74) *Attorney, Agent, or Firm*—Stites & Harbison PLLC; Juan Carlos A. Marquez, Esq.

(57) ABSTRACT

Collecting the sound while rotating at least one or more microphone around a rotational axis, the filter processing is carried out in accordance with the positional information of the microphone at each point.

4 Claims, 6 Drawing Sheets

SOUND COLLECTION SYSTEM

CROSS-REFERENCE TO RELATED APPLICATION

The present application claims priority from Japanese Patent Application JP 2004-243088 filed on Aug. 24, 2004, the content of which is hereby incorporated by reference into this application.

TECHNICAL FIELD OF THE INVENTION

The present invention relates to a microphone system for separating sounds generated from a plurality of sound sources for each sound source and recording them.

BACKGROUND OF THE INVENTION

A microphone for collecting a sound and converting it into an electric signal is roughly divided into two, namely, a unidirectional one and an omni directional one. As compared to the omni directional microphone, the unidirectional microphone can collect the sound from the sound source located in a direction to which the microphone is directed with higher sensitivity than the case of collecting the sound from the sound source (obstructive sound source) located in other direction.

However, since one microphone has limitations in improving the directionality, in order to improve the directionality more, it has been considered to use a microphone array in which a plurality of microphones are arranged in a row (for example, refer to "Acoustic System and Digital Processing", Institute of Electronics, Information and Communication Engineers, 1995, TOSHIAKI Ohga and others). A delay sum array as a typical system of the microphone array utilizes the fact that arrival times of the sounds from respective sound sources to respective microphones are different depending on spacious arrangements of respective microphones. Correcting arrival time differences of the sounds from the sound sources that are objects of recording to respective microphones and taking the average of the sound signals that are acquired from respective microphones, the sounds arriving from the sound sources that are objects of recording are emphasized and delete the sounds arriving from the directions other than these sound sources.

In addition, by automatically learning a filter which makes the sensitivity of the position of the obstructive sound source minimum, an adaptive beam former system as other system of the microphone array intends to selectively record only a sound from a sound source that is an object of recording.

There is also a system to estimate a position of a sound source by collecting the sound while moving the microphone (refer to Japanese Patent Application Laid-Open No. 8-292252).

According to the above-described delay sum array, considering a sound of a certain frequency, when the arrival time interval of the sound from the obstructive sound source to each microphone coincides with a time/an interval corresponding to one cycle of that frequency, according to the above-described average processing, the sound from the obstructive sound source is emphasized as same as the sound from the sound source that is an object of recording and this involves a problem such that an effect of separating the sound sources cannot be obtained. Specifically, in the case of recording the sound from a front direction of the microphone array as an object, there is a problem such that the sound of a certain frequency, which arrived from a certain direction and is not an object of recording, is recorded without being suppressed. This phenomenon is called as spacious aliasing.

In the adaptive beam former system, the number of the position where the sensitivity can be set at the minimum is limited to the number that one is subtracted from the number of the used microphones, and this results in that a capability of sound separation is lowered under the environment where many obstructive sound sources exist. In addition, it takes a certain period for learning of the filter and this involves a problem such that the capability of sound separation is lowered under the environment where the obstructive sound source is moving every moment. This is also a kind of spacious aliasing.

According to a method to collect the sound while moving the microphone in parallel on a rail described in Japanese Patent Application Laid-Open No. 8-292252, when the obstructive sound sources are separated, variation in a direction of the obstructive sound source due to movement in parallel is decreased. Therefore, there is a problem of the spacious aliasing yet.

Further, a capability of sound separation of the microphone array is decided by the number and arrangement of the microphone. In order to realize a high capability of sound separation, many microphones are necessarily used and this leads to a problem such that a cost is made higher and a space for setting cannot be managed.

SUMMARY OF THE INVENTION

The present invention has been made taking the foregoing problems into consideration and a typical invention disclosed in the present invention is as follows:

The present invention may comprise a sound collection system comprising at least one or more microphones, wherein the microphone collects sounds while rotating around a rotational axis or carrying out a pendular movement around a rotational axis.

By rotating the microphone around a rotational axis, a direction in which the capability of sound separation is lowered is changed temporally and this makes it possible to decrease affections of the spacious aliasing. In addition, knowledge about the number and the positions of the obstructive sound sources is not required in advance, therefore even if there are many obstructive sound sources or the positions of the obstructive sound sources are changed every moment, the capability of sound separation is not remarkably lowered and a stable capability can be obtained.

BRIEF DESCRIPTIONS OF THE DRAWINGS

DESCRIPTIONS OF THE PREFERRED EMBODIMENTS

Figure 1:
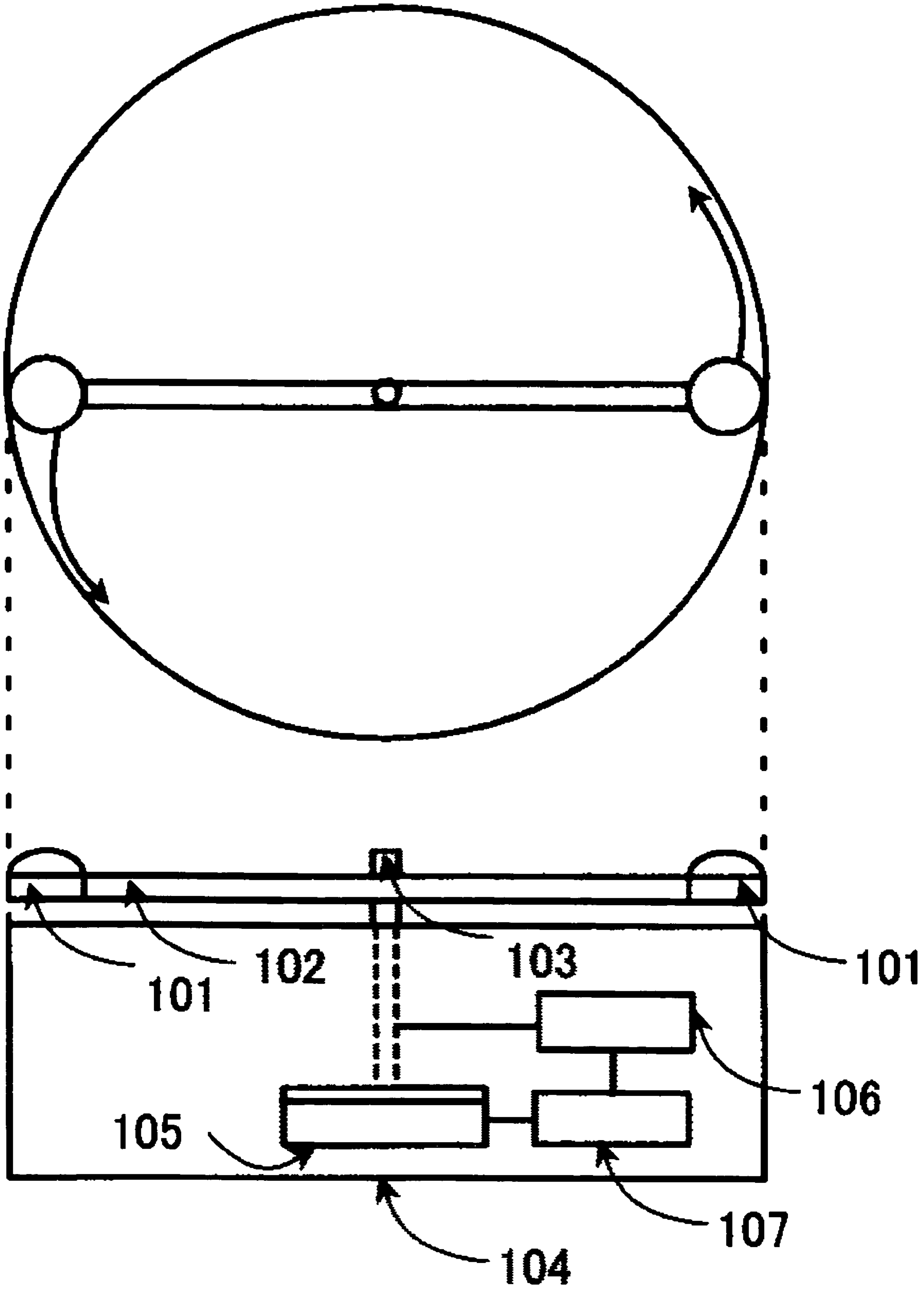
FIG. 1 illustrates an embodiment of a sound collection system using a microphone that is provided with a rotational mechanism.

FIG. 1 illustrates an embodiment with related to first, third, and fourth inventions. FIG. 1 is a sketch of a sound collection system. In FIG. 1, the upper part is a plane view and the lower part is a side view.

This sound collection system is configured by two microphones 101, a support bar 102, a rotational axis 103, a table seat 104, a motor 105, a filter processing unit 106, and a microphone position information obtaining unit 107. Two microphones 101 are fixed by the support bar 102. In consideration of the setting area, it is advantageous that the microphones 101 are fixed to the opposite ends of the support bar 102. A center of the support bar 102 is fixed to the rotational axis 103 and the rotational axis 103 is fixed to the motor 105 while penetrating the table seat 104. The motor 105 is provided with electric force from a power source that is not illustrated and due to an instruction from a control unit that is also not illustrated, start and stop of rotation are controlled. The filter processing unit 106 is electrically connected to each microphone 101 through the support bar 102 and the rotational axis 103. In addition, the filter processing unit 106 is electrically connected to the microphone position information obtaining unit 107 and the microphone position information obtaining unit 107 is electrically connected to the motor 105.

In the next place, the operation for selectively collecting the sound from the sound source as an object by the sound collection system shown in FIG. 1 will be described below.

The case that this sound collection system is located in a direction as the lower part of FIG. 1, namely, the case that the sound source is located by the side of the sound collection system will be described below. If the sound source of the objection is a conversation of a human being, the human being stands in front of this sound collection system and he or she speaks to the sound collection system.

Figure 5:
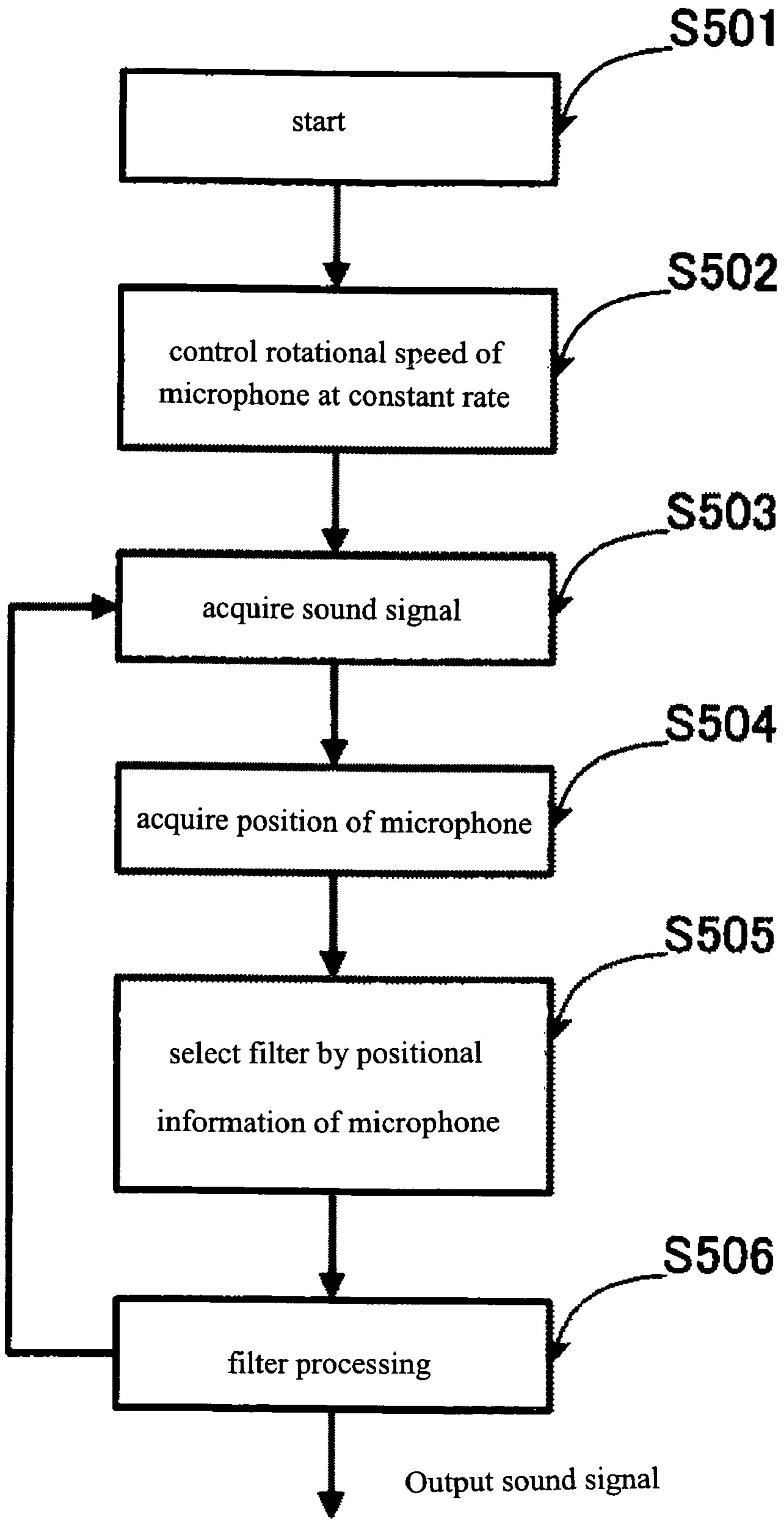
FIG. 5 illustrates an embodiment that a sound source separation processing flow is generalized.
Figure 6:
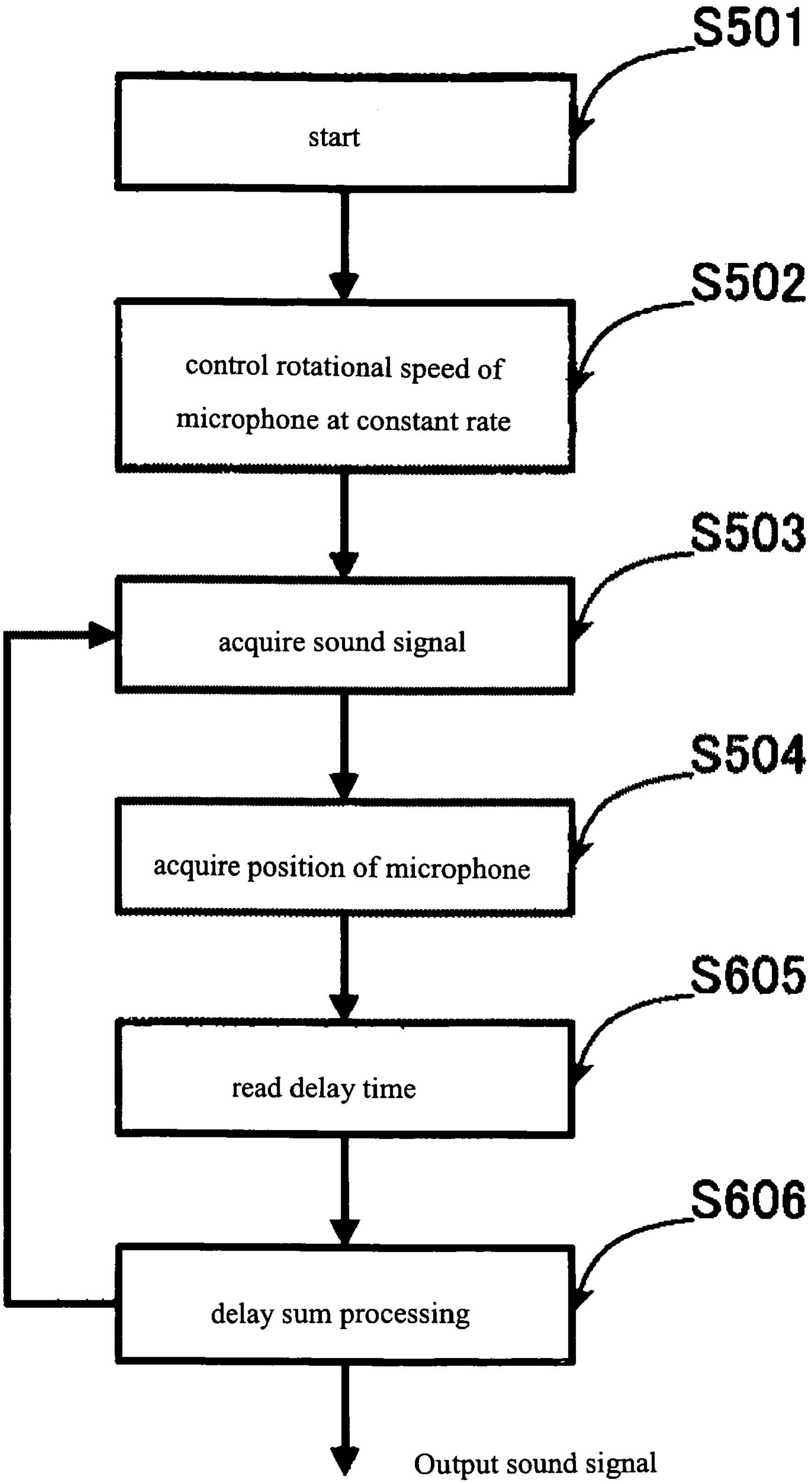
FIG. 6 illustrates an embodiment of a sound source separation processing flow in a delay sum system.

FIG. 5 shows a flow of the operation.

When collecting the sound, the control unit (not illustrated) may output instruction of rotation to the motor 105 to control a rotational speed at a constant rate (S502). In this time, the microphone position information obtaining unit 107 continues to measure an angle of a rotational element of the motor 105. Thereby, it is possible to obtain the spacious positional information of the microphone 101 at an arbitrary point.

As the microphone 101, for example, a dynamic microphone can be used. According to the dynamic microphone, due to a sound pressure on the microphone 101, a diaphragm incorporated in the microphone 101 oscillates and a magnet attached to the diaphragm oscillates in a coil and thereby, it is possible to convert the sound into electric signal due to electromagnetic induction. The electric signal in response to the collected sound is transmitted to the filter processing unit 106 through the support bar 102 and a signal line arranged in the rotational axis 103. As the microphone 101, a microphone having other structure such as a condenser microphone or the like can be also used.

The sounds collected by the microphone 101 are collected including the sounds other than the sounds from the sound sources of the object. A role of the filter processing unit 106 is to carry out the filter processing with respect to the electric signal in response to the collected sound, to separate noise by emphasizing the electric signal in response to the sounds from the sound sources of the object, and suppressing the electric signal in response to the sounds from other sound sources. According to a conventional microphone array that the position of the microphone is fixed, as a filter for separating the noise, only one kind of filter may be used, however, according to the present invention, since the position of the microphone 101 is changed every moment, when obtaining a sound signal for each sampling time (S503), the position of the microphone 101 is also obtained (S504), the filter processing for separating the noise in response to the position of the microphone 101 is selected (S505), and the filter processing is carried out (S506) so as to separate the noise. The processing order of acquisition of the sound signal (S503) and acquisition of the position of the microphone (S504) may be inversed.

The selection processing of the filter due to the positional information of the microphone 101 and the specific processing in the filter processing unit 106 will be described below.

For example, a method to carry out the processing in the same way as the delay sum array in response to the position of the microphone can be employed. Since a distance from the sound source is changed depending on the position of each microphone 101 at that time, the sound collected by each microphones 101 is temporally advance or behind the sound that is collected when each microphones 101 carries out no rotational movement. In the case, based on a position of the microphone 101 which is farthest from the sound source of the object, it can be said that all of the sounds collected in practice are temporally advance. Therefore, assuming that all microphones 101 are located at reference positions, in order to extract the sounds from the sound source of the object, adding appropriate delay to a signal obtained by A/D converting the electric signal to be obtained from each microphone 101, the average thereof may be taken.

By calculating distances between the positions of the objective sound sources and respective microphones and dividing these distances by a sonic speed, it is possible to calculate the arrival times of the sounds. A difference between the arrival time at the position of each microphone and the arrival time at the reference position is made into a delay time to be added. Since this delay time is changed due to the position of each microphone, acquiring the positional information from the microphone position information obtaining unit 107 for each sampling cycle, the delay time that has been obtained by that positional information in advance maybe selected. By adjusting the rotational speed so that a rotation of the microphone 101 takes time that is integral number of times as long as the sampling cycle, the position of the microphone 101 can be located to a limited position when sampling even if the microphone rotates in any number of times. Providing a number to this limited position, a table corresponding the delay time to the number may be stored in a ROM or a RAM.

Acquiring a sound signal from each microphone 101 at each sampling (S503) to store it in the RAM, the position of the microphone at that time is obtained (S504). The delay sum processing (S606) is carried out to take the average by reading the delay time in response to the position of each microphone from the above-described table (S605) and reading the sound signal that was obtained before the delay time from the RAM for each microphone.

The delay time that has been obtained in advance as described above is the delay time set on the basis of the distance from the objective sound source to each microphone 101. Therefore, this delay time is not appropriate for the sound arriving from other sound source. If the delay sum processing (S606) taking the average by adding the delay time that is not appropriate is carried out, the phases are displaced and they are cancelled each other, so that as same as the delay sum array, the sound arriving from other sound source can be suppressed. Thereby, the sound signal outputted due to the delay sum processing (S606) emphasizes the sound from the objective sound source.

According to the above-described method, the delay time is integral number of times as long as the sampling cycle, however, the actual delay time is not always integral number of times as long as the sampling cycle and it may be deviated. Due to an affect of this deviation, the phases of the sound signals from respective microphones 101 are deviated to some extents and a reproducibility of the objective sound maybe deteriorated. In order to prevent this, for example, the following two methods are available.

According to a first method, by adjusting the rotational number or the sampling cycle, the delay time at the position of the microphone at all sampling times is made closer to a value integral number of times as long as the sampling cycle. Thereby, the processing can be simplified.

A second method is an up-sampling method for complementing intervals between the data of the obtained sound signals and making the sampling cycle shorter in a pseudo manner. Making the sampling cycle shorter, the deviation between the actual delay time and the dispersed delay time is decreased and this results in improvement of the reproducibility of the objective sound.

The above-described filter processing can be also realized by FIR (Finite-duration Impulse Response) filter processing.

In addition, since the content of the filter processing is changed by the minute, no problem such as the spacious aliasing as in the case of the delay sum array occurs. Further, since the information other than that about the position of the sound source is not used when designing a filter and the filter learning is not carried out in real time, this is advantageous because the processing can be carried out rapidly even when the obstructive sound source is moving by the minute.

In this case, the description is given assuming that the objective sound source is located in the direction viewing the lower part of FIG. 1 from a front side, however, it is also possible to consider the case that the objective sound source is located in the direction viewing the upper part of FIG. 1 from a front side. Also, in this case, the appropriate filter processing may be decided for each position of the microphone 101.

Generally speaking, the filter processing for each position of the microphone 101 is changed due to a positional relation between the position of the objective sound source and the sound collection system according to the present invention. Thereby, according to an embodiment of the present invention, a method of the patterns of the filter processing are limited so that a user can simply select it. Specifically, making it possible to changing two settings of transverse placement and longitudinal placement by a switch in advance, in accordance with setting, the sound collection system according to the present invention can be set toward the objective sound source. Specifically, preparing two sets recording a FIR filter coefficient in the ROM for each filter position for transverse placement and longitudinal placement, depending on mode selection by the switch, the set to be read may be changed.

According to other embodiment, as described in an example of a conference room in later, it is also possible, preparing plural and different filter processing for a plurality of the objective sound sources, to output a plurality of the sound signals to which respective filter processing are applied. According to further other embodiment, providing means for inputting the positional relation between the sound collection system and the objective sound source, the filter processing can be also decided from the inputted positional relation. In order to input the positional relation, a method for inputting the positional relation by the GUI, a method for attaching a plurality of switches around the sound collection system and inputting the positional relation when the user operates the nearest switch, and a method for outputting the instruction from the audio conversation to the sound collection system inputted by the user, estimating and inputting the direction of the sound of the conversation by a MUSIC method or the like maybe available. Thus, for the use of dynamically changing the filter processing, it is advantageous to realize the filter processing by the FIR processing due to software because it makes easier to change the filter setting.

According to the microphone array of the delay sum array system, the sound source separation property is decided by the number of microphones and intervals thereof. However, according to the sound collection system of the present invention, the rotational speed of the microphone 101 also changes the sound source separation property. Accordingly, by measuring the sound source separation property for each rotational speed in advance and designating the sound source separation property that is demanded by the user when using the system, the optimum rotational speed can be selected at the system side and the user can use it. The sound source separation property can be obtained as a gain by the frequency and by the direction, so that if a frequency band of the obstructive sound source is determined, the rotational number having a high sound source separation property with respect to the frequency band may be selected. Specifically, when the user desires to suppress the operational sound of an air conditioner in a room, the rotational number having a high sound source separation property with respect to the frequency band of the operational sound of the air conditioner is designated, and when the user desires to suppress the operational sound of a cleaner, the rotational number having a high sound source separation property with respect to this frequency band of the operational sound of the cleaner is designated, and in such a manner, the high sound source separation property can be realized in accordance with the condition in the same sound collection system.

In the case that the frequency band of the obstructive sound source can be predicted when a manufacture is developed as the above-described example, for the convenience of the user, it may be effective to provide a switch for the air conditioner or the cleaner. In addition, a method to decide the appropriate number of rotation by recording the obstructive sound from the obstructive sound source by the sound collection system and analyzing the frequency of the recorded sound may be available. Due to this method, the user can realize the sound source separation property that is suitable for his or her usage environment.

The sound collection system shown in FIG. 1 can be used for a voice control of equipment mounted in a car such as a car navigation system to improve accuracy of recognition or for suppressing a noise in the case of hand-free conversation when it is mounted on a dashboard of the car. In addition, the sound collection system shown in FIG. 1 can be also used for a voice control of equipment such as a TV set, a video player, and an audio set or the like to improve accuracy of recognition when it is mounted on a table of a living room. In the case of using the sound collection system shown in FIG. 1 for recording the content of a conference when it is mounted on the table of the conference room, a voice of each attendee of the conference becomes an object of sound collection. It becomes possible to record each voice clearly, by preparing a filter processing unit that is set to make one attendee as an objective sound source and make other attendees as an obstructive sound source for each attendee. In the microphone array arranged in a row, it is a problem in what direction the array is directed, however, according to the sound collection system of the present invention, it is advantageous that the same separation properties are effective for the voices of all attendees regardless of which direction the setting is directed.

Such effect can be realized by arranging many microphones 101 on a periphery on which the microphones 101 moving, however, according to the present invention, since the same effect can be realized by fewer microphones 101, there is an advantage such that the cost can be reduced.

Figure 2:
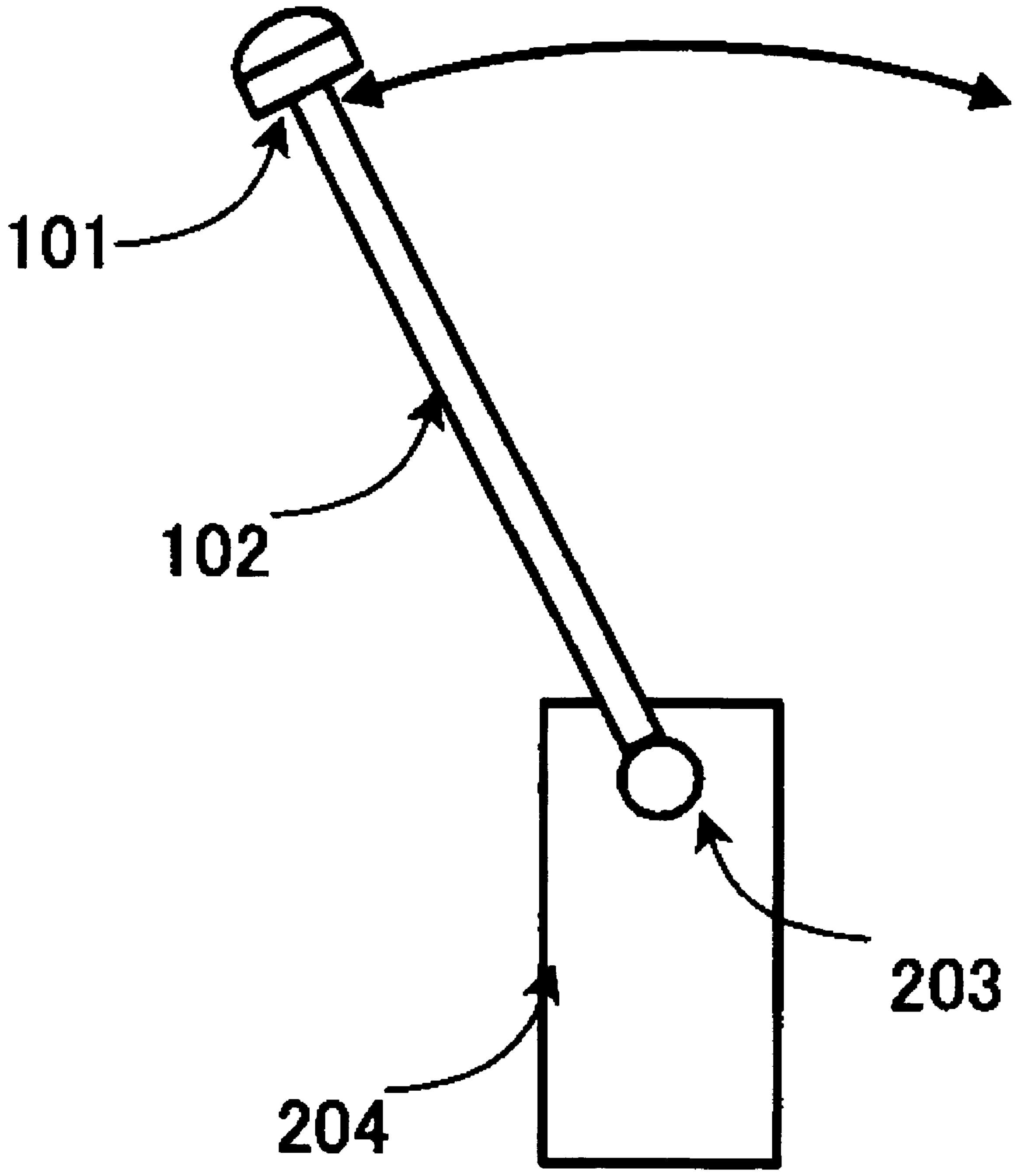
FIG. 2 illustrates an embodiment of a sound collection system using a microphone performing a pendular movement.

FIG. 2 illustrates second and third embodiments of the present invention. In FIG. 2, one microphone 101, a support bar 102, a rotational axis 203, and a table seat 204 mounted on a table are illustrated. In this sound collection system, a motor (not illustrated) is set within the table seat 204 and transmitting motivity to the rotational axis 203, the support bar 102 and the microphone 101 are moved.

According to this embodiment, the microphone 101 does not rotate around the rotational axis once but it carries out a pendular movement. In this embodiment, it is advantageous that a ratio of horizontal and vertical size of the system can be changed. In addition, even if one microphone 101 is only used, by deciding the appropriate FIR filter by each position of the microphone 101, it is possible to emphasize the objective sound.

Figure 3:
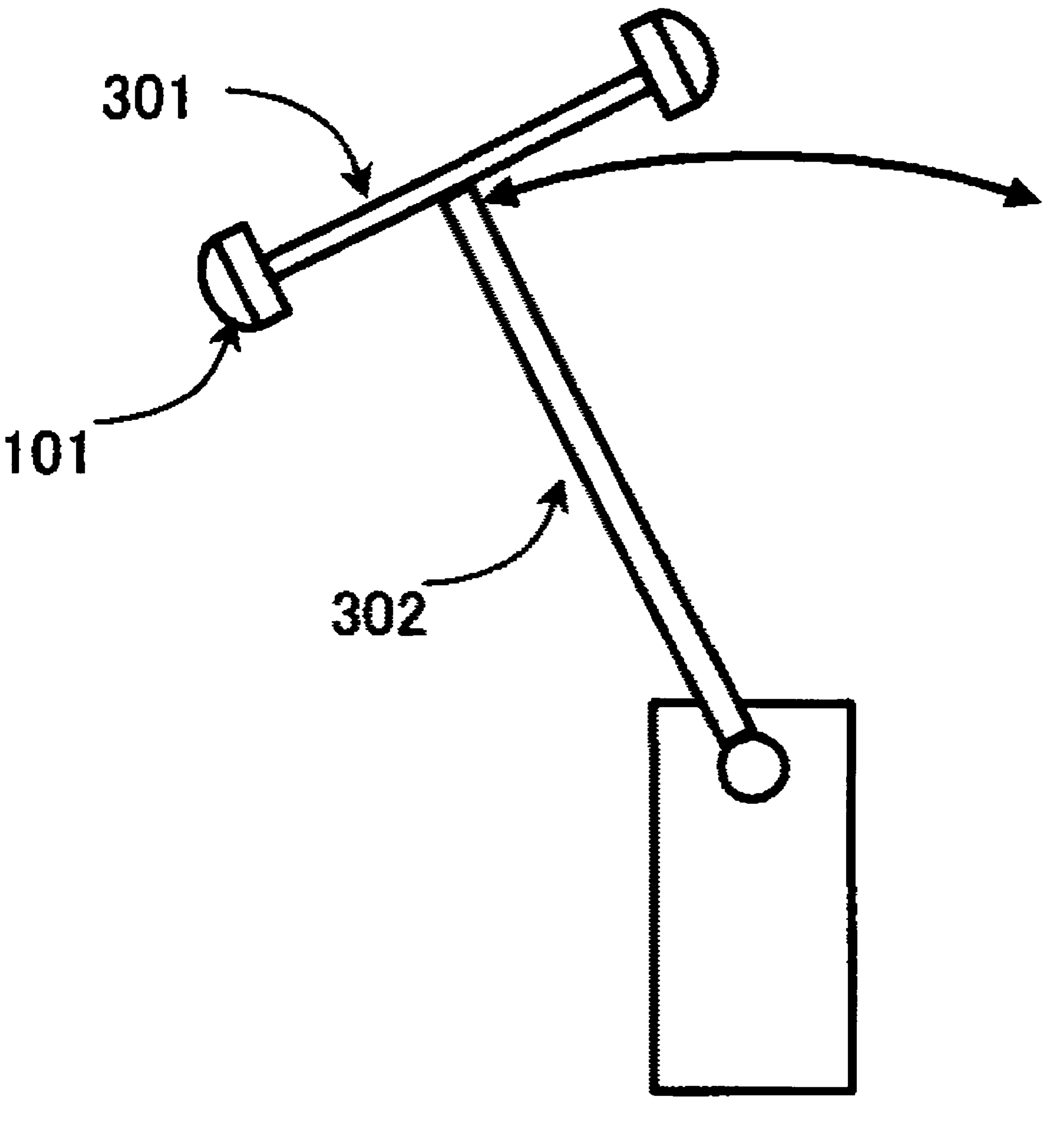
FIG. 3 illustrates an embodiment of a sound collection system using a plurality of microphones performing a pendular movement.

According to the configuration in the case of using a plurality of microphones, as shown in FIG. 3, it may be possible that a plurality of microphones 101 are fixed on the ends of support bar 302, the plurality of microphones 101 being fixed on other support bar 301.

When there are plural microphones 101, as comparing a pendular movement system to a parallel movement system, a direction of entire arrangement of the microphones 101 is changed even if the moving distances are the same, so there is an advantage to reduce the spacious aliasing.

Figure 4:
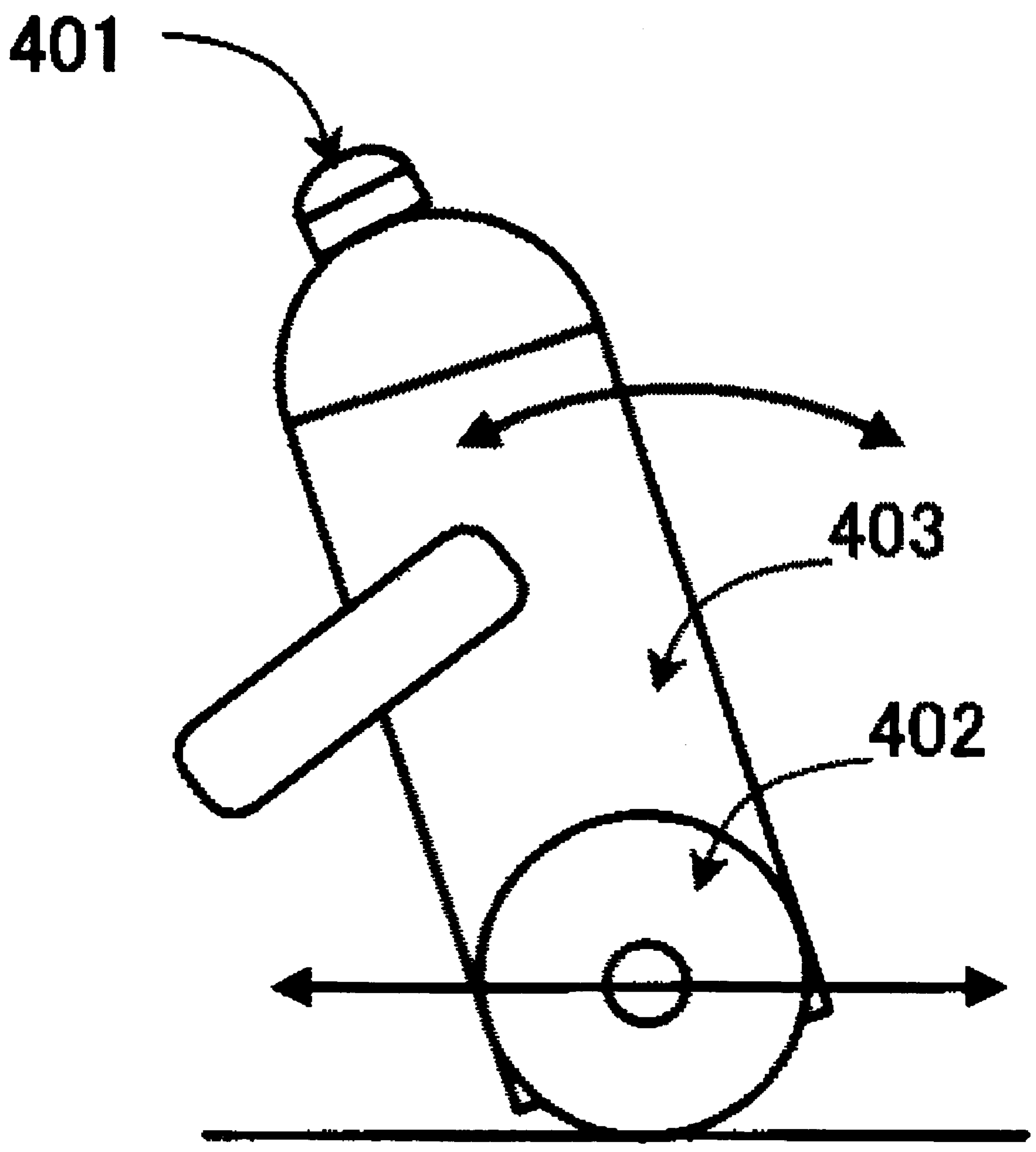
FIG. 4 illustrates an embodiment that a sound collection system is applied to a robot.

FIG. 4 illustrates an embodiment when the second and third inventions are applied to a robot. In this case, the robot is an inverted pendular type and the robot moves by rotating a tire 402, and keeps a balance of a chassis 403. When the robot of the inverted pendular type carries out the pendular movement of the chassis 403 around the tire 402, it is possible to carry out the pendular movement of a microphone 401 that is arranged at a head of the robot. Therefore, according to the above-described methods, it is possible to emphasize the objective sound from the sounds collected by the microphone 401.

In addition, in place of the microphone 401, the sound collection system as shown in FIG. 1 may be also set at the head of the robot. In this case, the filter processing is decided depending on the position of the microphone within the sound collection system shown in FIG. 1 and the position of the sound collection system shown in FIG. 1 due to movement of the chassis 403.

What is claimed is:

1. A sound collection system comprising at least one or more microphones, comprising:

a microphone positional information acquiring unit for acquiring positional information of the at least one or more microphones; and a filter processing unit for selecting a filter on a basis of the acquired microphone positional information and carrying out filter processing on at least one sound signal that is collected by the at least one or more microphones, wherein the at least one or more microphones collect sounds while carrying out a pendular movement around a rotational axis.

2. The sound collection system according to claim 1, wherein the filter processing serves to up-sample the acquired sound signal and take a delay sum.

3. The sound collection system according to claim 1, further comprising mode selection inputting means in accordance with a positional relation between the sound collection system and a sound source.

4. The sound collection system according to claim 1, further comprising means for designating a moving speed of the at least one or more microphones centering on the rotational axis.

* * * * *